United States Patent
Mizuno et al.

(10) Patent No.: US 11,110,920 B2
(45) Date of Patent: Sep. 7, 2021

(54) VEHICLE TRAVEL CONTROL APPARATUS

(71) Applicant: Honda Motor Co., Ltd., Tokyo (JP)

(72) Inventors: Toshiyuki Mizuno, Wako (JP); Akira Kito, Wako (JP); Yoshiaki Konishi, Wako (JP); Takayuki Kishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 315 days.

(21) Appl. No.: 16/264,436

(22) Filed: Jan. 31, 2019

(65) Prior Publication Data

US 2019/0248369 A1    Aug. 15, 2019

(30) Foreign Application Priority Data

Feb. 9, 2018   (JP) .............................. JP2018-021471

(51) Int. Cl.
*B60W 30/16*   (2020.01)
*G05D 1/00*    (2006.01)
(Continued)

(52) U.S. Cl.
CPC ............ *B60W 30/16* (2013.01); *B60W 10/04* (2013.01); *B60W 10/10* (2013.01); *B60W 50/00* (2013.01);
(Continued)

(58) Field of Classification Search
CPC ...... B60W 30/16; B60W 10/04; B60W 10/10; B60W 50/00; B60W 2552/10; B60W 2554/801; B60W 2050/007; B60W 2710/1005; B60W 2720/106; B60W 30/162; B60W 30/165; B60W 30/17;
(Continued)

(56) References Cited

U.S. PATENT DOCUMENTS

2003/0217880 A1* 11/2003 Isogai ................... B60W 30/16
                                                    180/170
2014/0088814 A1*  3/2014 You ...................... G05D 1/0061
                                                      701/23
(Continued)

FOREIGN PATENT DOCUMENTS

JP    2002225587 A    8/2002
JP    2009113763 A    5/2009
(Continued)

OTHER PUBLICATIONS

English translation of Tsuneo, JP H11-42955 A, Published Feb. 16, 1999, pp. 4-6 (Year: 1999).*
(Continued)

*Primary Examiner* — James J Lee
*Assistant Examiner* — Alexander George Matta
(74) *Attorney, Agent, or Firm* — Duft & Bornsen, PC

(57) ABSTRACT

A vehicle travel control apparatus configured to control an actuator for driving a vehicle with a self-driving capability so that the vehicle follows a forward vehicle in front of the vehicle, and including an electric control unit having a microprocessor and a memory. The microprocessor is configured to perform: recognizing a travel pattern of the forward vehicle; setting a travel mode with an acceleration performance in accordance with the travel pattern recognized in the recognizing; and controlling the actuator so that the vehicle follows the forward vehicle in the travel mode set in the setting.

12 Claims, 9 Drawing Sheets

(51) Int. Cl.
*G05D 1/02* (2020.01)
*B60W 10/04* (2006.01)
*B60W 50/00* (2006.01)
*B60W 10/10* (2012.01)

(52) U.S. Cl.
CPC ......... *G05D 1/0088* (2013.01); *G05D 1/0212* (2013.01); *G05D 1/0287* (2013.01); *B60W 2050/007* (2013.01); *B60W 2552/00* (2020.02); *B60W 2554/801* (2020.02); *B60W 2710/1005* (2013.01); *B60W 2720/106* (2013.01)

(58) Field of Classification Search
CPC ......... B60W 2552/00; B60W 60/0053; B60W 60/0051; B60W 30/182; G05D 1/0088; G05D 1/0287; G05D 1/0212
See application file for complete search history.

(56) References Cited

U.S. PATENT DOCUMENTS

2018/0093668 A1* 4/2018 Kim ...................... B60W 50/14
2019/0241183 A1* 8/2019 Han ................... G06K 9/00798

FOREIGN PATENT DOCUMENTS

| JP | 2009292383 A | 12/2009 |
| JP | 2013203341 A | 10/2013 |
| JP | 2014227046 A | 12/2014 |

OTHER PUBLICATIONS

English translation of Tadashi, JP 4864655 B2, Published Feb. 1, 2012, pp. 2-6 (Year: 2012).*

* cited by examiner

VEHICLE TRAVEL CONTROL APPARATUS

CROSS-REFERENCE TO RELATED APPLICATION

This application is based upon and claims the benefit of priority from Japanese Patent Application No. 2018-021471 filed on Feb. 9, 2018, the content of which is incorporated herein by reference.

BACKGROUND OF THE INVENTION

Field of the Invention

This invention relates to a vehicle travel control apparatus configured to control an actuator for driving a self-driving vehicle so as to follow a forward vehicle.

Description of the Related Art

Conventionally, as an apparatus of this type is known one adapted to respond to a switching operation by setting either normal follow mode or eco-follow mode, perform following forward vehicle (preceding vehicle) at acceleration compatible with normal mode when set in normal follow mode, and perform following forward vehicle at smaller acceleration when set in eco-follow mode than when set in normal follow mode. Such an apparatus is described, for example, in Japanese Unexamined Patent Publication No. 2009-113763 (JP2009-113763A).

However, traveling pattern differs among different forward vehicles, with some generally maintaining constant vehicle speed and others frequently accelerating and decelerating. Therefore, in the case of an apparatus like that of JP2009-113763A that sets modes differing in acceleration performance in response to switching, optimum following of a forward vehicle is apt to be difficult owing to insufficient acceleration capability.

SUMMARY OF THE INVENTION

An aspect of the present invention is a vehicle travel control apparatus configured to control an actuator for driving a vehicle with a self-driving capability so that the vehicle follows a forward vehicle in front of the vehicle. The vehicle travel control apparatus includes an electric control unit having a microprocessor and a memory. The microprocessor is configured to perform: recognizing a travel pattern of the forward vehicle; setting a travel mode with an acceleration performance in accordance with the travel pattern recognized in the recognizing; and controlling the actuator so that the vehicle follows the forward vehicle in the travel mode set in the setting.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
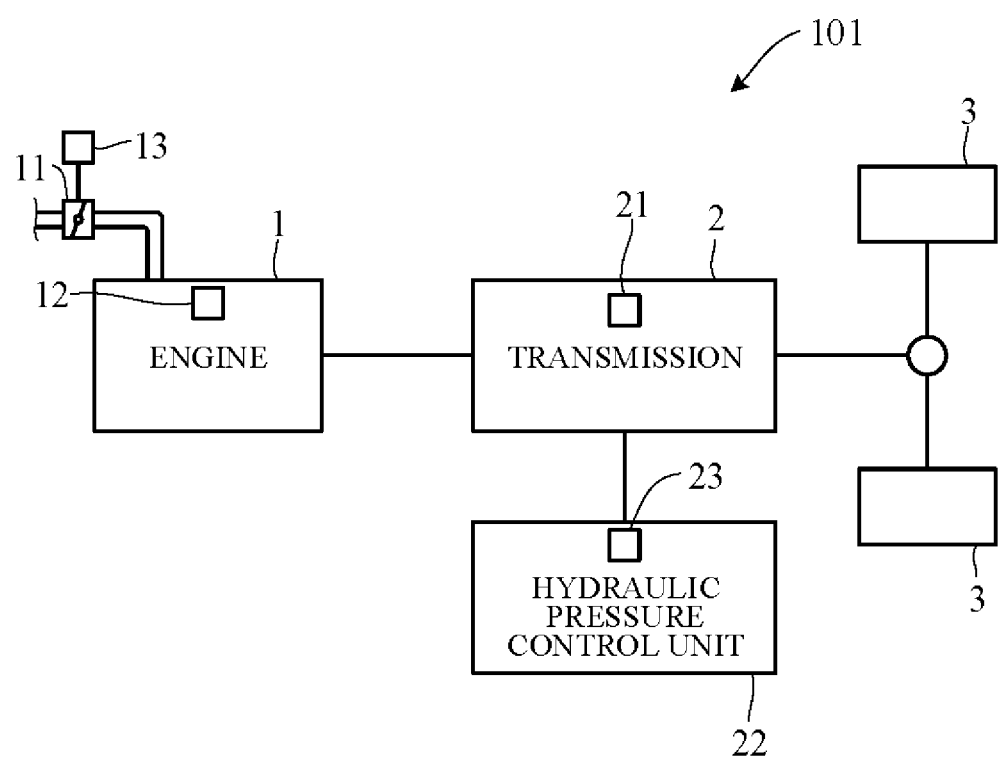
FIG. 1 is a diagram showing a configuration overview of a driving system of a self-driving vehicle to which a vehicle travel control apparatus according to an embodiment of the present invention is applied.

Hereinafter, an embodiment of the present invention is explained with reference to FIGS. 1 to 13. A vehicle travel control apparatus according to an embodiment of the present invention is applied to a vehicle (self-driving vehicle) having a self-driving capability. FIG. 1 is a diagram showing a configuration overview of a driving system of a self-driving vehicle 101 incorporating a travel control apparatus according to the present embodiment. Herein, the self-driving vehicle may be sometimes called "subject vehicle" to differentiate it from other vehicles. The vehicle 101 is not limited to driving in a self-drive mode requiring no driver driving operations but is also capable of driving in a manual drive mode by driver operations.

As shown in FIG. 1, the vehicle 101 includes an engine 1 and a transmission 2. The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Air intake volume is metered by the throttle valve. An opening angle of the throttle valve 11 (throttle opening angle) is changed by a throttle actuator 13 operated by an electric signal. The opening angle of the throttle valve 11 and an amount of fuel injected from the injector 12 (injection timing and injection time) are controlled by a controller 40 (FIG. 2).

The transmission 2, which is installed in a power transmission path between the engine 1 and drive wheels 3, changes a speed of rotation output from the engine 1, and converts and outputs torque output from the engine 1. The rotation of speed converted by the transmission 2 is transmitted to the drive wheels 3, thereby propelling the vehicle 101. Optionally, the vehicle 101 can be configured as an electric vehicle or hybrid vehicle by providing a drive motor as a drive power source in place of or in addition to the engine 1.

The transmission 2 is, for example, a stepped transmission enabling stepwise speed ratio (gear ratio) shifting in accordance with multiple (e.g. six) speed stages. Optionally, a continuously variable transmission enabling stepless speed ratio shifting can be used as the transmission 2. Although omitted in the drawings, power output from the engine 1 can be input to the transmission 2 through a torque converter. The transmission 2 can, for example, incorporate a dog clutch, friction clutch or other engaging element 21. A hydraulic pressure control unit 22 can shift speed stage of the transmission 2 by controlling flow of oil to the engaging element 21. The hydraulic pressure control unit 22 includes a solenoid valve or other valve mechanism operated by electric signals (called "shift actuator 23" for sake of convenience), and an appropriate speed stage can be implemented by changing flow of hydraulic pressure to the engaging element 21 in response to operation of the shift actuator 23.

Figure 2:
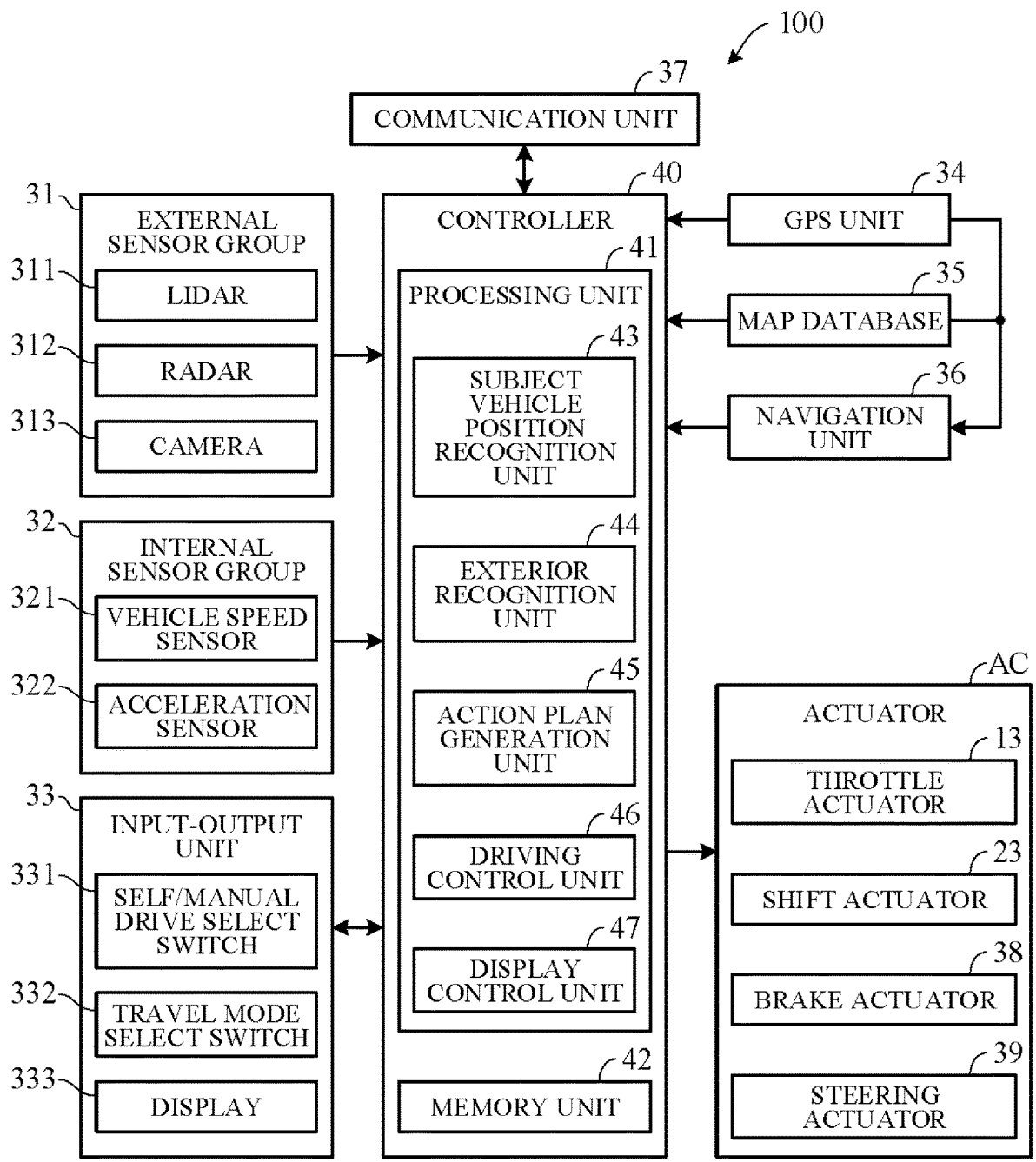
FIG. 2 is a block diagram schematically illustrating overall configuration of the vehicle travel control apparatus according to an embodiment of the present invention.

FIG. 2 is a block diagram schematically illustrating overall configuration of a vehicle travel control apparatus (vehicle travel control system) 100 according to an embodiment of the present invention. As shown in FIG. 2, the vehicle travel control apparatus 100 includes mainly of the controller 40, and as members communicably connected with the controller 40 through CAN (Controller Area Network) communication or the like, an external sensor group 31, an internal sensor group 32, an input-output unit 33, a GPS unit 34, a map database 35, a navigation unit 36, a communication unit 37, and actuators AC.

The term external sensor group 31 herein is a collective designation encompassing multiple sensors (external sensors) for detecting external circumstances constituting subject vehicle ambience data. For example, the external sensor group 31 includes, inter alia, a LIDAR 311 (Light Detection and Ranging) for measuring distance from the vehicle to ambient obstacles by measuring scattered light produced by laser light radiated from the subject vehicle in every direction, a RADAR 312 (Radio Detection and Ranging) for detecting other vehicles and obstacles around the subject vehicle by radiating electromagnetic waves and detecting reflected waves, and a CCD, CMOS or other image sensor equipped on-board cameras 313 for imaging subject vehicle ambience (forward, reward and sideways).

The term internal sensor group 32 herein is a collective designation encompassing multiple sensors (internal sensors) for detecting subject vehicle driving state. For example, the internal sensor group 32 includes, inter alia, a vehicle speed sensor 321 for detecting vehicle speed of the subject vehicle and acceleration sensors 322 for detecting forward-rearward direction acceleration and lateral acceleration of the subject vehicle, respectively. Further the internal sensor group 32 includes an engine speed sensor for detecting rotational speed of the engine 1 (engine speed), a yaw rate sensor for detecting rotation angle speed around a vertical axis through subject vehicle center of gravity, and a throttle opening sensor for detecting opening angle of the throttle valve 11 (throttle opening angle). The internal sensor group 32 also includes sensors for detecting driver driving operations in manual drive mode, including, for example, accelerator pedal operations, brake pedal operations, steering wheel operations and the like.

The term input-output unit 33 is used herein as a collective designation encompassing apparatuses receiving instructions input by the driver and outputting information to the driver. The input-output unit 33 includes, inter alia, switches which the driver uses to input various instructions (for example, a self/manual drive select switch 331 and a travel mode select switch 332), a display 333 for presenting information to the driver via displayed images, a microphone which the driver uses to input voice instructions, and a speaker for presenting information to the driver by voice.

The self/manual drive select switch 331, for example, is configured as a switch manually operable by the driver to output an instruction of switching to a self-drive mode enabling self-drive functions or a manual drive mode disabling self-drive functions in accordance with operation of the switch. Optionally, the self/manual drive select switch 331 can be configured to instruct switching from manual drive mode to self-drive mode or from self-drive mode to manual drive mode when a predetermined condition is satisfied without operating the self/manual drive select switch 331. In other words, drive mode can be switched automatically not manually in response to automatic switching of the self/manual drive select switch.

The travel mode select switch 332, for example, is configured as a switch manually operable by the driver to output an instruction of selecting one of travel modes. The travel modes include normal mode that balances fuel economy performance and power performance, sport mode that prioritizes power performance over fuel economy performance, economy mode that prioritizes fuel economy performance over power performance, and autonomous travel mode that autonomously sets travel mode. Travel mode in accordance with operation of the travel mode select switch 332 from among these travel modes is selected and instructed.

Economy mode, normal mode and sport mode can be selected in manual drive mode and in self-drive mode, while autonomous travel mode can be select only in self-drive mode. When drive mode is changed from manual drive mode to self-drive mode, travel mode selected in manual drive mode is reset and then autonomous travel mode is autonomously selected. After that, the travel mode select switch 332 is operated, travel mode in accordance with the switch operation is selected. On the other hand, when drive mode is changed from self-drive mode to manual drive mode, travel mode is autonomously changed to normal mode.

The GPS unit 34 includes a GPS receiver for receiving position determination signals from multiple GPS satellites, and measures absolute position (latitude, longitude and the like) of the subject vehicle based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33.

Target routes are computed based on subject vehicle current position measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are provided to perform driving of the vehicle 101. The actuators AC include a throttle actuator 13 for adjusting opening angle of the throttle valve of the engine 1 (throttle opening angle), a shift actuator 23 for changing speed stage of the transmission 2, a brake actuator 38 for operating a braking device, and a steering actuator 39 for driving a steering unit.

The controller 40 is constituted by an electronic control unit (ECU). In FIG. 2, the controller 40 is integrally configured by consolidating multiple function-differentiated ECUs such as an engine control ECU, a transmission control ECU, a clutch control ECU and so on. Optionally, these ECUs can be individually provided. The controller 40 incorporates a computer including a CPU or other processing unit (a microprocessor) 41, the memory unit (a memory) 42 of RAM, ROM, hard disk and the like, and other peripheral circuits such as I/O interface not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference, various programs for performing processing, and threshold values used in the programs, etc.

As functional configurations, the processing unit 41 includes a subject vehicle position recognition unit 43, an exterior recognition unit 44, an action plan generation unit 45, a driving control unit 46, and a display control unit 47.

The subject vehicle position recognition unit 43 recognizes map position of the subject vehicle (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 101 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the subject vehicle based on signals from LIDARs 311, RADARs 312, cameras 313 and the like of the external sensor group 31. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a subject vehicle driving path (target path) from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time $\Delta t$ (e.g., 0.1 sec) between present time point and a predetermined time period T (e.g., 5 sec) ahead, i.e., includes action plan data set in association with every unit time $\Delta t$ interval. The action plan data include subject vehicle position data and vehicle state data for every unit time $\Delta t$. The position data are, for example, target point data indicating 2D coordinate position on road, and the vehicle state data are vehicle speed data indicating vehicle speed, direction data indicating subject vehicle direction, and the like. Therefore, when accelerating the subject vehicle to target vehicle speed within the predetermined time period T, the action plan includes target vehicle speed data. The vehicle state data can be determined from position data change of successive unit times $\Delta t$. Action plan is updated every unit time $\Delta t$.

Figure 3:
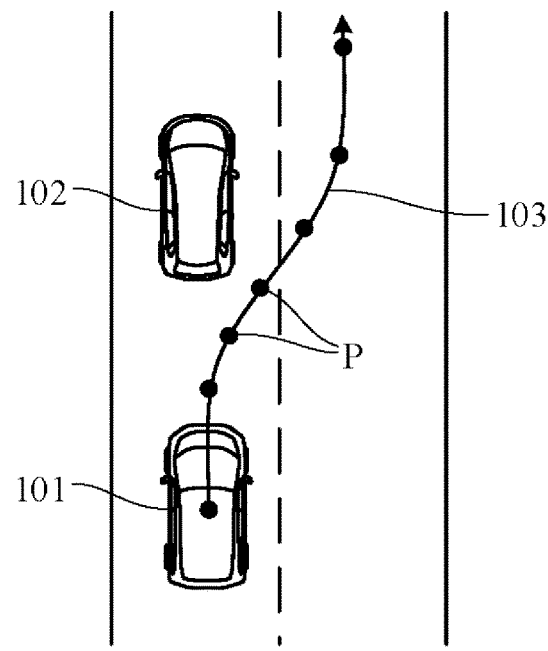
FIG. 3 is a diagram showing an example of an action plan generated by an action plan generation unit of FIG. 2.

FIG. 3 is a diagram showing an action plan generated by the action plan generation unit 45. FIG. 3 shows a scene depicting an action plan for the subject vehicle 101 when changing lanes and overtaking a vehicle 102 ahead. Points P in FIG. 3 correspond to position data at every unit time $\Delta t$ between present time point and predetermined time period T1 ahead. A target path 103 is obtained by connecting the points P in time order. The action plan generation unit 45 generates not only overtake action plans but also various other kinds of action plans for, inter alia, lane-changing to move from one traffic lane to another, lane-keeping to maintain same lane and not stray into another, and decelerating or accelerating.

When generating a target path, the action plan generation unit 45 first decides a drive mode and generates the target path in line with the drive mode. When creating an action plan for lane-keeping, for example, the action plan generation unit 45 firsts decides drive mode from among modes such as cruising, overtaking, decelerating, and curve negotiating. To cite particular cases, the action plan generation unit 45 decides cruising mode as drive mode when no other vehicle is present ahead of the subject vehicle (no forward vehicle) and decides following mode as drive mode when a vehicle ahead (forward vehicle) is present. In following mode, the action plan generation unit 45 generates, for example, travel plan data for suitably controlling inter-vehicle distance to a forward vehicle to target inter-vehicle distance in accordance with vehicle speed. The target inter-vehicle distance in accordance with vehicle speed is stored in the memory unit 42 in advance.

In self-drive mode, the driving control unit 46 controls the actuators AC to drive the subject vehicle 101 along target path 103 generated by the action plan generation unit 45. For example, the driving control unit 46 controls the throttle actuator 13, shift actuator 23, brake actuator 38 and steering actuator 39 so as to drive the subject vehicle 101 through the points P of the unit times Δt in FIG. 3.

More specifically, in self-drive mode, the driving control unit 46 calculates acceleration (target acceleration) of sequential unit times Δt based on vehicle speed (target vehicle speed) at points P of sequential unit times Δt on target path 103 (FIG. 3) included in the action plan generated by the action plan generation unit 45. In addition, the driving control unit 46 calculates required driving force for achieving the target accelerations taking running resistance caused by road gradient and the like into account. And the actuators AC are feedback controlled to bring actual acceleration detected by the internal sensor group 32, for example, into coincidence with target acceleration. On the other hand, in manual drive mode, the driving control unit 46 controls the actuators AC in accordance with driving instructions by the driver (accelerator opening angle and the like) acquired from the internal sensor group 32.

The display control unit 47 outputs control signals to the input-output unit 33 to control image on the display 333 (FIG. 2) placed in front of driver's seat.

Controlling of the transmission 2 by the driving control unit 46 is explained concretely. The driving control unit 46 controls shift operation (shifting) of the transmission 2 by outputting control signals to the shift actuator 23 using a shift map stored in the memory unit 42 in advance to serve as a shift operation reference.

Figure 4:
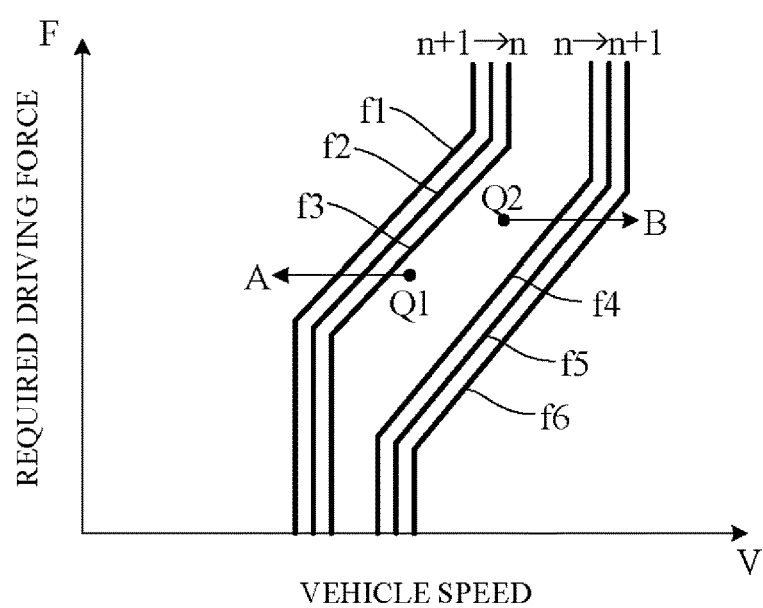
FIG. 4 is a diagram showing an example of a shift map stored in a memory unit of FIG. 2.

FIG. 4 is a diagram showing an example of the shift map stored in the memory unit 42, in particular, an example of the shift maps corresponding to economy mode, normal mode, and sport mode in self-drive mode. In the drawing, horizontal axis is scaled for vehicle speed V and vertical axis for required driving force F. Required driving force F is in one-to-one correspondence to accelerator opening angle which is an amount of operation of an accelerator (in self-drive mode, simulated accelerator opening angle) or throttle opening angle, and required driving force F increases with increasing accelerator opening angle or throttle opening angle. Therefore, the vertical axis can instead be scaled for accelerator opening angle or throttle opening angle.

In FIG. 4, characteristic curves f1, f2 and f3 are an example of downshift curves corresponding to downshift from "n+1" speed stage to "n" speed stage in economy mode, normal mode and sport mode, respectively, and characteristic curves f4, f5 and f6 are an example of upshift curves corresponding to upshift from "n" speed stage to "n+1" speed stage in economy mode, normal mode and sport mode. Characteristic curves f3 and f6 in sport mode are shifted to high vehicle speed side than characteristic curves f2 and f5 in normal mode, respectively. Characteristic curves f1 and f4 in economy mode are shifted to low vehicle speed side than characteristic curves f2 and f5 in normal mode, respectively.

For example, considering downshift from operating point Q1 as shown in FIG. 4, in a case where vehicle speed V decreases under constant required driving force F, the transmission 2 downshifts from "n+1" speed stage to "n" speed stage when operating point Q1 crosses downshift curves (characteristics f1, f2 and f3) (arrow A). Also, in a case where required driving force F increases under constant vehicle speed V, the transmission 2 downshifts when operating point Q1 crosses downshift curve.

On the other hand, considering upshift from operating point Q2, in a case where vehicle speed V increases under constant required driving force F, the transmission 2 upshifts from "n" stage to "n+1" stage when operating point Q2 crosses upshift curves (characteristic curves f4, f5 and f6; arrow B). Also, in a case where required driving force F decreases under constant vehicle speed V, the transmission 2 upshifts when operating point Q2 crosses upshift curves. Downshift curves and upshift curves are shifted to high speed side along with an increase of speed stage.

Characteristic curves f2 and f5 in normal mode are characteristic curves that balance fuel economy performance and power performance. On the other hand, characteristic curves f1 and f4 in economy mode are characteristic curves that prioritizes fuel economy performance or silent performance over power performance, and characteristic curves f3 and f6 in sport mode are characteristic curves that power performance over fuel economy performance. Since characteristic curves f1 and f4 are shifted to low vehicle speed side than characteristic curves f2 and f5, upshift time is advanced and downshift time is delayed in economy mode. Therefore, the subject vehicle in economy mode tends to travel at speed stage greater than in normal mode (at high speed stage side), and acceleration response in economy mode is low. On the other hand, since characteristic curves f3 and f6 are shifted to high vehicle speed side than characteristic curves f2 and f5, upshift time is delayed and downshift time is advanced in sport mode. Therefore, the subject vehicle in economy mode tends to travel at speed stage smaller than in normal mode (at low speed stage side), and acceleration response in economy mode is high.

Although not shown in the drawings, shift maps corresponding to economy mode, normal mode and sport mode in manual drive mode are stored in the memory unit 42. These characteristic curves in manual drive mode are the same as characteristic curves in self-drive mode (FIG. 4). Optionally, characteristic curves in manual drive mode can be different from characteristic curves in self-drive mode.

When a vehicle equipped with the so-configured vehicle travel control apparatus 100 follows a forward vehicle, travel pattern of the forward vehicle (followed vehicle) depends on the followed vehicle's characteristics and/or the followed vehicle driver's characteristics (i.e., habits and the like). Various actual patterns are conceivable as travel patterns of the forward vehicle, such as ones marked by high frequency of maintaining constant vehicle speed and ones marked by high frequency of acceleration and deceleration. When the subject vehicle autonomously follows the forward vehicle in self-drive mode, therefore, it needs to select a travel mode with high acceleration response matched to the travel pattern of the forward vehicle, because degree of divergence between actual inter-vehicle distance and target inter-vehicle distance otherwise becomes large and makes optimum vehicle-following difficult. So the vehicle travel control apparatus 100 according to the present embodiment is configured taking this issue into account, as set out in the following.

Figure 5:
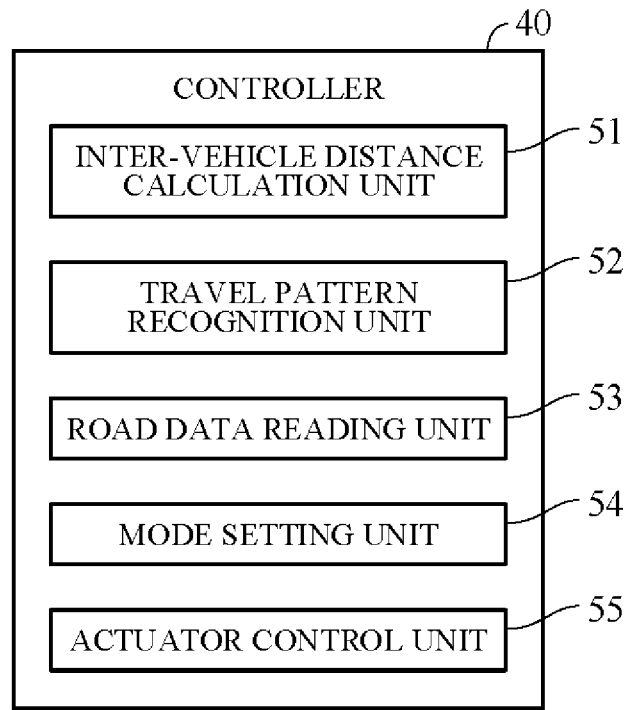
FIG. 5 is a block diagram illustrating main configuration of the vehicle travel control apparatus according to the embodiment of the present invention.

FIG. 5 is a block diagram showing main components of the vehicle travel control apparatus according to an embodiment of the present invention, particularly functional configurations of the controller 40 viewed from a different perspective than in FIG. 2. As shown in FIG. 5, the controller 40 includes an inter-vehicle distance calculation unit 51, a travel pattern recognition unit 52, a road data reading unit 53, a mode setting unit 54, and an actuator control unit 55. Among these, the inter-vehicle distance calculation unit 51 and travel pattern recognition unit 52 are implemented by, for example, the exterior recognition unit 44 of FIG. 2, the road data reading unit 53 by, for example, the subject vehicle position recognition unit 43 thereof, the mode setting unit 54 by, for example, the action plan generation unit 45 thereof, and the actuator control unit 55 by, for example, the driving control unit 46 thereof.

The inter-vehicle distance calculation unit 51 calculates actual inter-vehicle distance L between subject vehicle and a forward vehicle based on signals from the RADAR 312 and/or the camera 313.

The travel pattern recognition unit 52 recognizes travel pattern of a forward vehicle from degree of divergence of inter-vehicle distance L from target inter-vehicle distance La (follow ratio $\alpha A$). More specifically, the travel pattern recognition unit 52 first calculates deviation between actual inter-vehicle distance L and target inter-vehicle distance La at vehicle speed detected by the vehicle speed sensor 321, i.e., distance deviation $\Delta L$ (=L−La).

Figure 6:
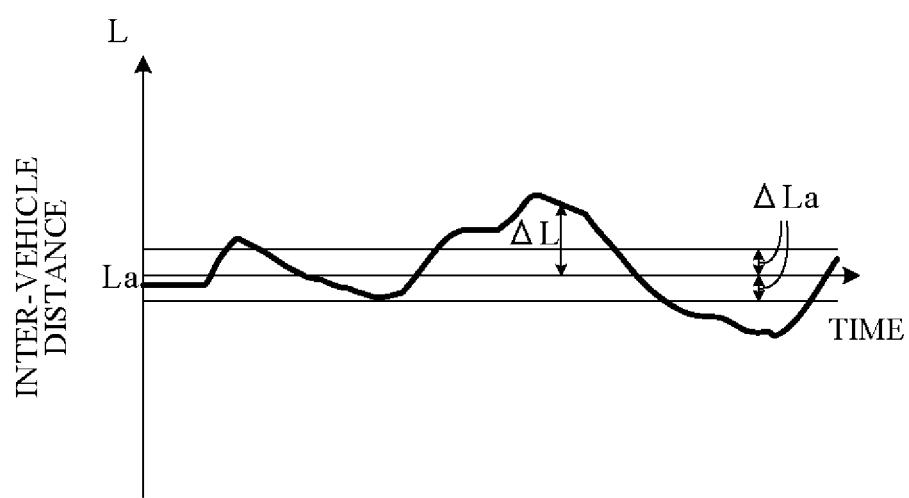
FIG. 6 is a diagram showing an example of time-course change of an actual inter-vehicle distance with respect to a target inter-vehicle distance.

FIG. 6 is diagram showing an example of time-course change of actual inter-vehicle distance L with respect to target inter-vehicle distance La. In the example of FIG. 6, actual inter-vehicle distance L varies with respect to target inter-vehicle distance La by positive deviation $\Delta L$ (L>La) or negative deviation $\Delta L$ (L<La). For example, the travel pattern recognition unit 52 calculates time period that absolute value of deviation $\Delta L$ stays within predetermined value $\Delta La$ (e.g., within 5% of target inter-vehicle distance La) and calculates follow ratio $\alpha A$ (%) by dividing this time period by total running time. Follow precision is higher in proportion as follow ratio $\alpha A$ is greater. Optionally, magnitude of distance deviation $\Delta L$ can be weighted to decrease follow ratio $\alpha A$ in proportion as absolute value of distance deviation $\Delta L$ is greater.

Figure 7:
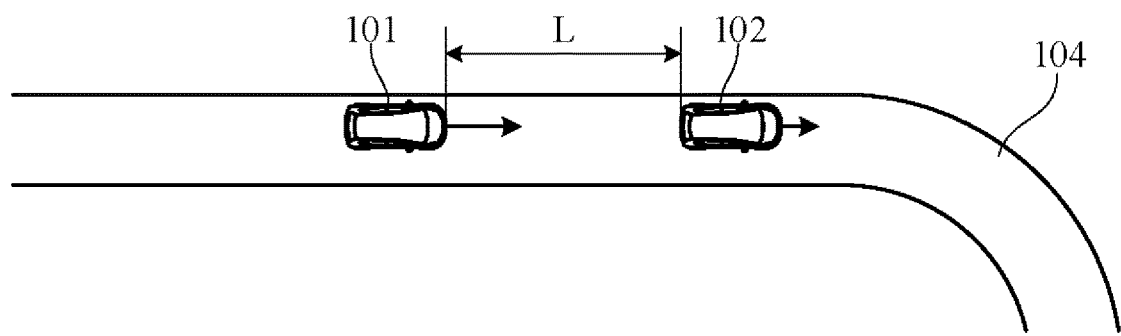
FIG. 7 is a diagram showing an example of the subject vehicle following a forward vehicle.

Such a follow ratio $\alpha A$ is affected by road condition. FIG. 7 is a diagram showing an example of the subject vehicle following a forward vehicle. In the example of FIG. 7, inter-vehicle distance L between the subject vehicle 101 and the forward vehicle 102 shortens because the forward vehicle 102 decelerates upon approaching a curve 104. When the forward vehicle 102 thereafter accelerates upon rounding the curve 104, inter-vehicle distance L between the subject vehicle 101 and the forward vehicle 102 widens. Such change in the inter-vehicle distance L is attributable to road condition, while follow ratio $\alpha A$ varies in accordance with change in inter-vehicle distance L. This means that the travel pattern recognition unit 52 must take road condition into consideration in order to accurately recognize travel pattern of the forward vehicle 102. This is the reason for incorporating the road data reading unit 53 in the controller 40.

The road data reading unit 53 reads subject vehicle surrounding road data. Specifically, it utilizes subject vehicle position data obtained by the GPS unit 34 and map data from the map database 35 to recognize subject vehicle map position. The travel pattern recognition unit 52 calculates follow ratio $\alpha A$ from subject vehicle surrounding road data (map position of the subject vehicle) read by the road data reading unit 53. For example, when the road data reading unit 53 reads data on the curve 104, the travel pattern recognition unit 52 corrects distance deviation $\Delta L$ by multiplying distance deviation $\Delta L$ by a predetermined coefficient greater than 0 and less than 1. Or it otherwise corrects follow ratio $\alpha A$ by directly multiplying follow ratio $\alpha A$ by a coefficient (predetermined coefficient greater than 1 in this case). This enables accurate recognition of the travel pattern of the forward vehicle.

Figure 8:
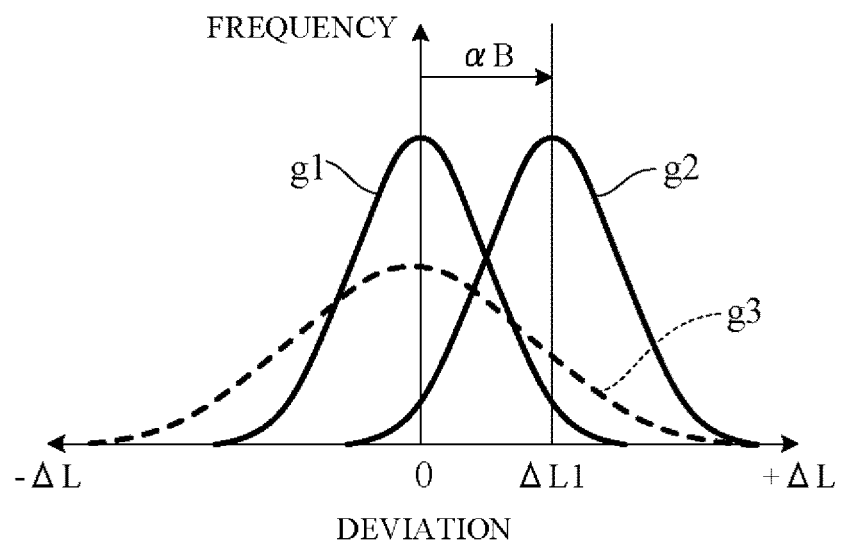
FIG. 8 is a diagram showing examples of normal distribution of frequency of a distance deviation between the actual inter-vehicle distance and the target inter-vehicle distance.

Optionally, where frequency of deviation $\Delta L$ between actual inter-vehicle distance L and target inter-vehicle distance La is expressed in normal distribution, the travel pattern recognition unit 52 can recognize travel pattern of the forward vehicle from, for example, mean value thereof (distance deviation mean value $\alpha B$). FIG. 8 is a diagram showing examples of distance deviation $\Delta L$ frequency expressed in normal distribution. Normal distribution curve g1 is an example in which distance deviation mean value $\alpha B$ is 0, and normal distribution curve g2 is an example in which distance deviation mean value $\alpha B$ is +$\Delta L1$. Curve g3 (dotted line) is an example of a normal distribution curve whose distance deviation mean value $\alpha B$ is 0 and whose dispersion value is larger than that of normal distribution curve g1. Dispersion expresses degree of acceleration delay or deceleration delay with respect to the forward vehicle. Optionally, therefore, the travel pattern recognition unit 52 can be adapted to recognize travel pattern taking not only distance deviation mean value $\alpha B$ but also magnitude of normal distribution dispersion into consideration. In such case, also, distance deviation mean value $\alpha B$ is preferably multiplied by a coefficient for correction in accordance with curved road or other other road condition.

Figure 9:
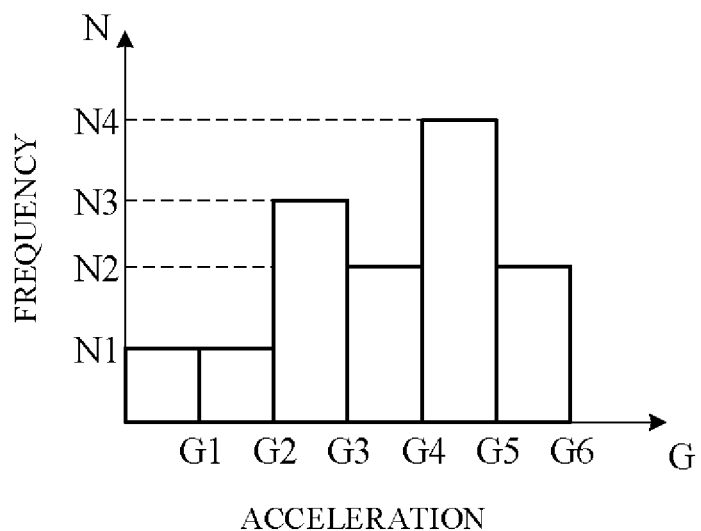
FIG. 9 is a histogram showing a frequency distribution of acceleration of the forward vehicle.

Optionally, the travel pattern recognition unit 52 can recognize travel pattern of the forward vehicle from mean value of acceleration magnitude (absolute value) (acceleration mean value $\alpha C$), for example, instead of from follow ratio $\alpha A$ or distance deviation mean value $\alpha B$. Acceleration of the forward vehicle can be determined, for example, by first obtaining acceleration of forward vehicle relative to subject vehicle (relative acceleration) by calculating second derivative with respect to time of actual inter-vehicle distance L calculated by the inter-vehicle distance calculation unit 51 and then adding subject vehicle acceleration detected by the acceleration sensor 322 to this relative acceleration. FIG. 9 is a histogram showing frequency (count) distribution of acceleration G of the forward vehicle. The travel pattern recognition unit 52 calculates acceleration mean value $\alpha C$ by multiplying accelerations G1 to G6 shown in FIG. 9 by their frequencies and dividing the sum total of the individual acceleration multiplication values (in the example of FIG. 9, G1×N1+G2×N1+G3×N3+ . . . ) by total value of the frequencies (in the example of FIG. 9, N1+N1+N3+N2+N4+N2). In such case, also, acceleration mean value $\alpha C$ is preferably corrected by multiplying a coefficient for correction in accordance with curved road or other road condition.

The travel pattern recognition unit 52 uses follow ratio $\alpha A$, distance deviation mean value $\alpha B$ or acceleration mean value $\alpha C$ calculated as set out in the foregoing to calculate travel pattern of the forward vehicle as numerically quantified follow-evaluation value $\beta$. Follow-evaluation value $\beta$ is a value expressing degree of difference between subject vehicle travel pattern and forward vehicle travel pattern. Travel pattern difference is smaller and vehicle following easier in proportion as follow-evaluation value $\beta$ is smaller. Follow-evaluation value $\beta$ is, for example, defined to have minimum value of 0 and maximum value of 100.

Figure 10A:
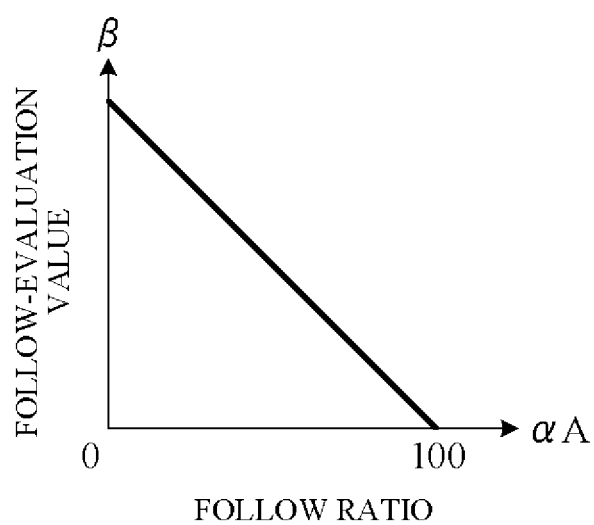
FIG. 10A is a diagram sowing an example of a relationship between follow ratio and follow-evaluation value.
Figure 10B:
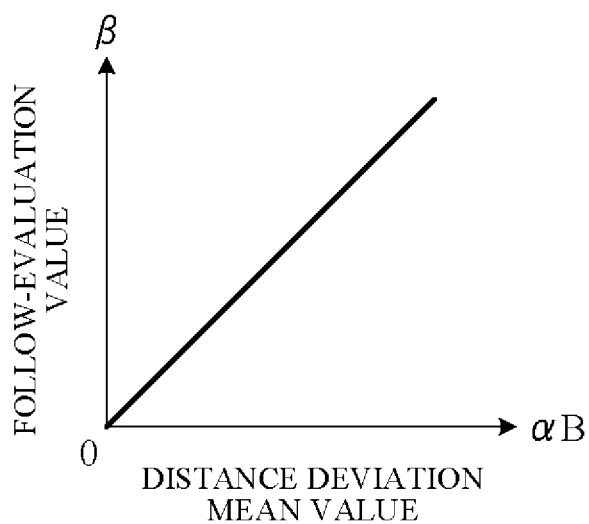
FIG. 10B is a diagram sowing an example of a relationship between distance deviation mean value and follow-evaluation value.
Figure 10C:
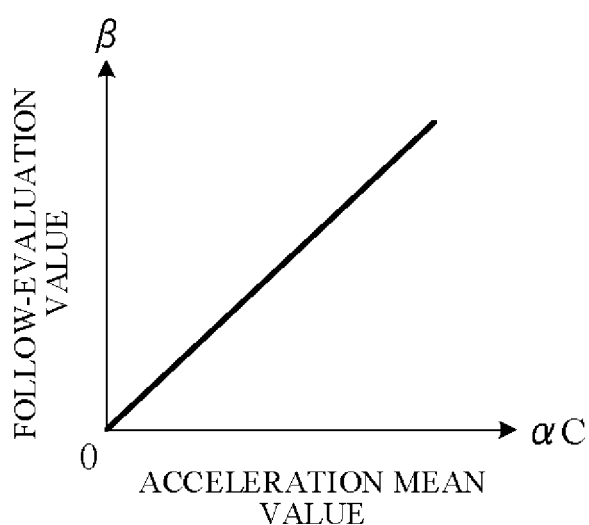
FIG. 10C is a diagram sowing an example of a relationship between acceleration mean value and follow-evaluation value.

FIGS. 10A, 10B and 10C are characteristic curves respectively showing relationship between follow ratio $\alpha A$ and follow-evaluation value $\beta$, between distance deviation mean value $\alpha B$ and follow-evaluation value $\beta$, and between acceleration mean value $\alpha C$ and follow-evaluation value $\beta$. These characteristics are stored in the memory unit 42 in advance. As shown in FIG. 10A, follow-evaluation value $\beta$ decreases with increasing follow ratio αA and becomes 0 when follow ratio αA is 100(%). As shown in FIG. 10B, follow-evaluation value β increases with increasing distance deviation mean value αB, owing to increasing difficulty of vehicle-following, and follow-evaluation value β becomes 0 when distance deviation mean value αB is 0. As shown in FIG. 10C, follow-evaluation value β increases with increasing acceleration mean value αC, owing to increasing difficulty of vehicle-following, and follow-evaluation value β becomes 0 when acceleration mean value αC is 0. The follow-evaluation value β can have characteristics expressed by curves instead of by straight lines as shown in FIGS. 10A to 10C.

Figure 11:
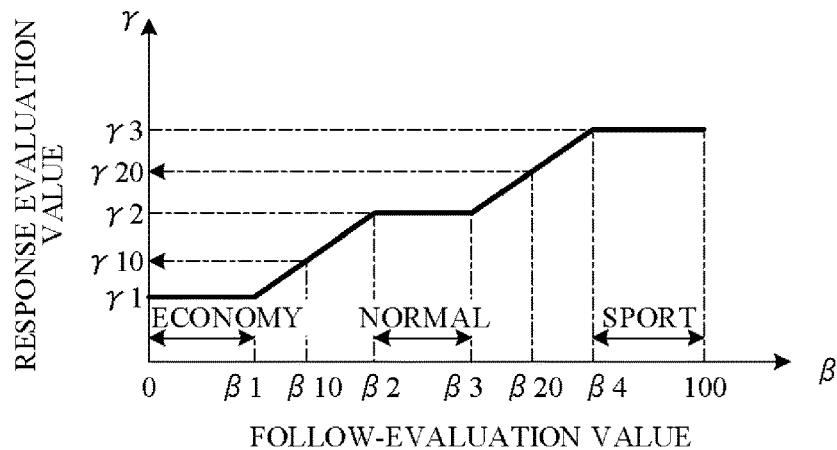
FIG. 11 is a diagram showing a relationship between follow-evaluation value and response evaluation value stored in the memory unit.

The mode setting unit 54 sets a travel mode having acceleration performance (acceleration response) matched to the travel pattern recognized by the travel pattern recognition unit 52, i.e., matched to follow-evaluation value β. FIG. 11 is a diagram showing relationship between follow-evaluation value β and response evaluation value γ obtained by numerically quantifying acceleration response, stored in the memory unit 42 in advance. As shown in FIG. 11, response evaluation value γ is minimum (γ1) in follow-evaluation value β range of less than β1 and gradually increases in follow-evaluation value β range of not less than β1 and less than β2. Moreover, response evaluation value γ is constant (γ2) in follow-evaluation value β range of not less than β2 and less than β3, gradually increases in follow-evaluation value β range of not less than β3 and less than β4, and is maximum (γ3) in follow-evaluation value β range of not less than β4.

Response evaluation values γ1, γ2 and γ3 correspond to economy mode, normal mode and sport mode, respectively. The mode setting unit 54 therefore sets travel mode to economy mode when follow-evaluation value β is less than β1 (economy range), to normal mode when follow-evaluation value β is not less than β2 and less than β3 (normal range), and to sport mode when follow-evaluation value β is not less than β4 (sport range).

In addition, when follow-evaluation value β is between economy range and normal range (e.g., β10), response evaluation value γ is a value between γ1 and γ2 (e.g., γ10), and the mode setting unit 54 sets travel mode in accordance with this response evaluation value γ10. Specifically, it sets downshift characteristic curve between economy mode characteristic curve f1 and normal mode characteristic curve f2 (FIG. 4), and sets upshift characteristic curve between economy mode characteristic curve f4 and normal mode characteristic curve f5.

Further, when follow-evaluation value β is between normal range and sport range (e.g., β20), response evaluation value γ is a value between γ2 and γ3 (e.g., γ20), and the mode setting unit 54 sets travel mode in accordance with this response evaluation value γ20. Specifically, it sets downshift characteristic curve between normal mode characteristic curve f2 and sport mode characteristic curve f3 (FIG. 4), and sets upshift characteristic curve between normal mode characteristic curve f5 and sport mode characteristic curve f6.

Thus, in the present embodiment, in follow-evaluation value ranges of not less than β1 and less than β2 and of not less than β3 and less than β4, response evaluation values γ are linearly determined between γ1 and γ2 and between γ2 and γ3 in accordance with follow-evaluation value β, and travel mode is set in accordance with these response evaluation values γ. This makes setting of travel modes other than economy mode, normal mode and sport mode possible. In other words, travel modes that interpolate between economy mode and normal mode and between normal mode and sport mode can be set. This enables acceleration response between economy mode and normal mode and between normal mode and sport mode to be fine-tuned in accordance with travel pattern of the forward vehicle.

The actuator control unit 55 controls the throttle actuator 13, shift actuator 23 and the like to ensure that the subject vehicle follows the forward vehicle in the travel mode set by the mode setting unit 54. So when the travel pattern of the forward vehicle is marked by frequent acceleration and deceleration, for example, the subject vehicle more frequently travels in a low gear side speed stage having high acceleration response. Since the subject vehicle can therefore realize acceleration response matched to the travel pattern of the forward vehicle, it can achieve excellent vehicle following.

Figure 12:
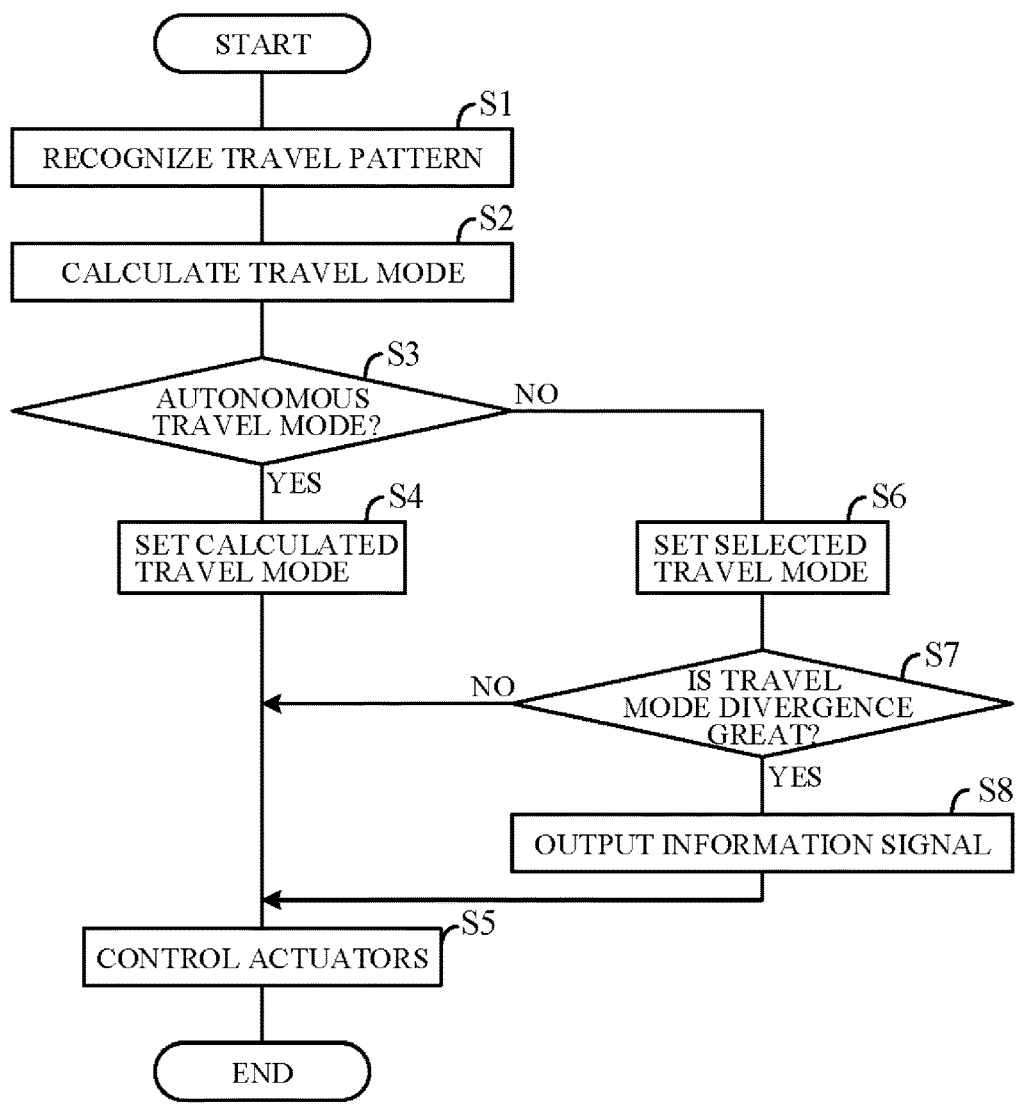
FIG. 12 is a flow chart showing an example of processing performed by a controller of FIG. 5.

FIG. 12 is a flowchart showing an example of processing performed by the controller 40 in accordance with a program stored in the memory unit 42 (FIG. 2) in advance. The processing shown in this flowchart is started when driving in self-drive mode is instructed by, for example, switching of the self/manual drive select switch 331.

First, in S1 (S: processing Step), the travel pattern recognition unit 52 recognizes travel pattern of a forward vehicle from, for example, degree of divergence from target inter-vehicle distance La of inter-vehicle distance L between subject vehicle and forward vehicle (i.e., follow ratio αA). Specifically, the travel pattern recognition unit 52 calculates follow-evaluation value β (numerically quantified travel pattern). Alternatively, it is possible to recognize forward vehicle travel pattern by calculating follow-evaluation value β from distance deviation mean value αB or acceleration mean value αC, instead from follow ratio αA. In recognizing travel pattern, ratio αA (αB, αC) is preferably corrected with consideration to road condition.

Next, in S2, the mode setting unit 54 uses characteristics of FIG. 11 stored in the memory unit in advance to calculate a travel mode whose acceleration response matches follow-evaluation value β calculated in S1. To be more exact, it calculates response evaluation value γ corresponding to the travel mode.

Next, in S3, whether autonomous travel mode is selected by the travel mode select switch 332 is determined. If a positive decision is made in S3, the routine proceeds to S4, in which the mode setting unit 54 sets travel mode calculated in S2. When difference between response evaluation value γ in current travel mode and response evaluation value γ in the calculated travel mode is great at this time, travel mode (response evaluation value γ) is gradually transitioned from current travel mode to calculated travel mode. As a result, sudden change in subject vehicle behavior can be avoided.

Next, in S5, the actuator control unit 55 outputs control signals to, inter alia, the throttle actuator 13 and the shift actuator 23 so that the subject vehicle follows the forward vehicle in the set travel mode.

On the other hand, if a negative decision is made in S3, the routine proceeds to S6, in which the mode setting unit 54 sets travel mode selected by the travel mode select switch 332, i.e., sets travel mode selected from among economy mode, normal mode and sport mode is selected. Next, in S7, the mode setting unit 54 determines whether difference between response evaluation value γ corresponding to travel mode selected in S6 and response evaluation value γ corresponding to travel mode calculated in S2 is equal to or greater than a predetermined value, i.e., whether travel mode divergence is great.

If a positive decision is made in S7, the routine proceeds to S8, and if a negative decision is made, proceeds to S5. In S8, the display control unit 47 outputs a control signal (information signal) to the display 333 to inform the driver via the display 333 to the effect that difference between current travel mode and autonomous travel mode calculated in S2 is great, whereafter the program goes to S5.

Figure 13:
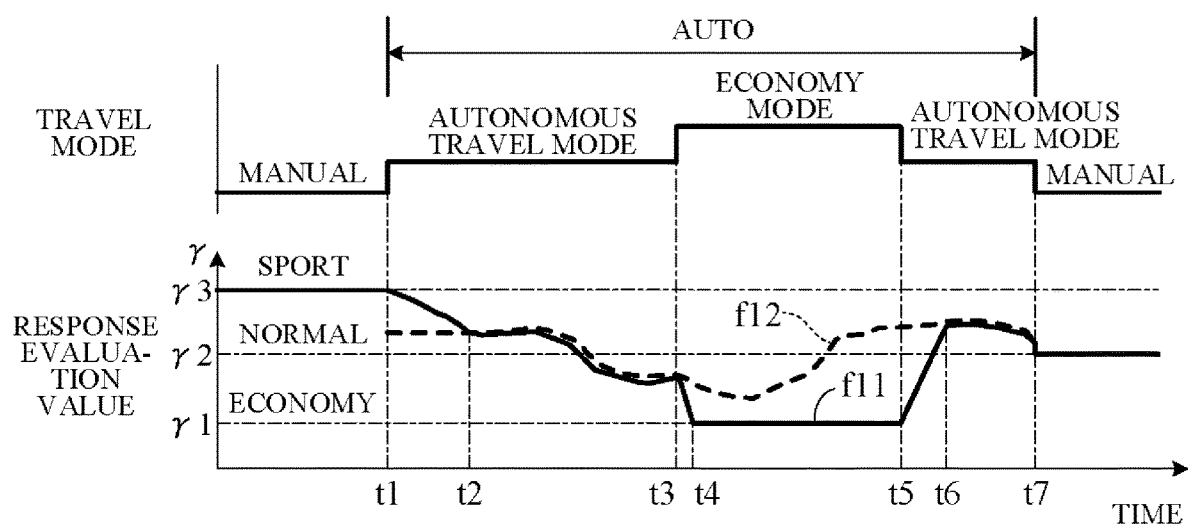
FIG. 13 is a time chart showing an example of how travel mode and response evaluation value change over time by the vehicle travel control apparatus according to the embodiment of the present invention.

Operation of the vehicle travel control apparatus 100 according to the present embodiment is concretely explained in the following. FIG. 13 is a time chart showing an example of how travel mode and response evaluation value change over time. Solid line characteristic curve f11 in the drawing relates to travel mode actually set by the mode setting unit 54 (called "actual travel mode"), and dotted line characteristic curve f12 relates to travel mode calculated by the mode setting unit 54 (called "calculated travel mode").

As an example, assume that during sport mode driving in manual drive mode, the self/manual drive select switch 331 is operated at time t1 to instruct switching of drive mode to self-drive mode. This results in travel mode being switched to autonomous travel mode (S3). Although actual travel mode (sport mode) and calculated travel mode differ from each other at this time (time t1), actual travel mode gradually converges on calculated travel mode to become coincident with calculated travel mode at time t2. Actual travel mode thereafter tracks calculated travel mode change up to time t3.

Since actual travel mode is therefore automatically set to calculated travel mode matched to travel pattern of the forward vehicle, the subject vehicle can perform suitable vehicle-following under acceleration response matched to travel pattern of the forward vehicle. Moreover, subject vehicle travel mode can be set to travel mode optimally suitable for performing vehicle-following because subject vehicle travel mode is set to conform not only with economy mode, normal mode and sport mode but also with linear characteristics that interpolate between these modes (FIG. 11). Moreover, upon switching to self-drive mode, the preceding travel mode (sport mode) is cancelled when autonomous travel mode is implemented, so that optimum self-drive mode can be realized without requiring the driver to operate the travel mode select switch 332.

When economy mode is selected by operation of the travel mode select switch 332 at time t3, actual travel mode gradually transitions to economy mode to complete switching to economy mode at time t4 (S6). As this enables selection of acceleration response in accordance with driver preference, running feel pleasing to the driver can be obtained. At this time, the display control unit 47 monitors deviation between actual travel mode and calculated travel mode (deviation $\Delta\gamma$ of response evaluation value $\gamma$) and responds to deviation $\Delta\gamma$ rising to or above the predetermined value by displaying a message or the like on the display 333 advising the driver to switch from economy mode to autonomous travel mode (S8). This facilitates recognition by the driver as to whether switching to autonomous travel mode is preferable.

When the driver instructs switching to autonomous travel mode at time t5, actual travel mode gradually converges on calculated travel mode to become coincident with calculated travel mode at time t6. When the self/manual drive select switch 331 instructs switching of drive mode to manual drive mode at time t7, actual travel mode is switched to manual drive mode. At this time, manual drive mode starts from normal mode.

The present embodiment can achieve advantages and effects such as the following:

(1) The vehicle travel control apparatus 100 controls traveling behavior of the subject vehicle so that the subject vehicle incorporating autonomous driving capability performs vehicle-following of the forward vehicle. More specifically, the vehicle travel control apparatus 100 includes the travel pattern recognition unit 52 for recognizing travel pattern of the forward vehicle; the mode setting unit 54 for setting a travel mode having acceleration performance (acceleration response) matched to travel pattern recognized by the travel pattern recognition unit 52; and the actuator control unit 55 for controlling, inter alia, the throttle actuator 13 and the shift actuator 23 to control the subject vehicle so as to follow the forward vehicle in the travel mode set by the mode setting unit 54 (FIGS. 2 and 5).

Since travel mode having acceleration performance matched to travel pattern of the forward vehicle is therefore automatically set, optimum vehicle-following of the forward vehicle can be achieved. Specifically, vehicle-following by self-driving can be performed at acceleration response matched to travel pattern of the forward vehicle, i.e., at high acceleration response when frequency of acceleration and deceleration of forward vehicle driving is high and at low acceleration response when, to the contrary, frequency of acceleration and deceleration of the forward vehicle driving is low.

(2) The vehicle travel control apparatus 100 further includes the inter-vehicle distance calculation unit 51 for calculating inter-vehicle distance L between the subject vehicle and the forward vehicle based on signals from RADAR 312, camera 313 or the like (FIG. 5). The travel pattern recognition unit 52 recognizes travel pattern from degree of divergence of inter-vehicle distance L calculated by the inter-vehicle distance calculation unit 51 from target inter-vehicle distance La (follow ratio $\alpha A$, distance deviation mean value $\alpha B$, acceleration mean value $\alpha C$). This enables good recognition of forward vehicle travel pattern in terms of, for example, frequency of acceleration and deceleration.

(3) The vehicle travel control apparatus 100 further includes the road data acquisition portion (GPS unit 34, map database 35 or the like) for acquiring subject vehicle surrounding road data (FIG. 5). The travel pattern recognition unit 52 further recognizes travel pattern using road data acquired by the road data acquisition portion. Since tendency of inter-vehicle distance to change during running on a curve or the like is therefore taken into consideration, travel pattern of the forward vehicle can be accurately recognized.

(4) The mode setting unit 54 sets travel mode matched to travel pattern recognized by the travel pattern recognition unit 52 from among multiple travel modes that include economy mode that places greater priority on fuel economy performance than on power performance, normal mode that balances power performance and fuel economy performance, and sport mode that that places greater priority on power performance than on fuel economy performance, and that further include travel modes interpolating between these modes. This enables selection of optimum travel mode from among multiple finely defined travel modes.

(5) The vehicle travel control apparatus 100 further includes the self/manual drive select switch 331 for designating either manual drive mode or self-drive mode and the travel mode select switch 332 for manually selecting one mode among economy mode, normal mode and sport mode (FIG. 2). When the self/manual drive select switch 331 designates manual drive mode, the mode setting unit 54 sets the travel mode selected by the travel mode select switch 332, and when the self/manual drive select switch 331 thereafter instructs switching of manual drive mode to self-drive mode, travel mode is gradually transitioned from travel mode selected by the travel mode select switch 332 to travel mode having acceleration performance matched to travel pattern recognized by the travel pattern recognition unit 52. Since this suppresses rapid change of travel mode, smooth vehicle behavior with no adverse effect on ride comfort can be achieved.

(6) When self-drive mode is designated by the self/manual drive select switch 331 and travel mode is manually selected by the travel mode select switch 332, the mode setting unit 54 sets the travel mode selected by the travel mode select switch 332. Acceleration response preferred by the driver can therefore be obtained even in self-drive mode.

(7) The vehicle travel control apparatus 100 further includes the display 333 and the display control unit 47 (FIG. 2) for notifying the driver when difference between acceleration performance (response evaluation value γ) prescribed in travel mode selected by the travel mode select switch 332 and acceleration performance (response evaluation value γ) matched to the travel pattern recognized by the travel pattern recognition unit 52 is equal to or greater than a predetermined value. The driver therefore can easily decide whether switching to autonomous travel mode needs.

(8) The actuators AC for traveling the subject vehicle include the shift actuator 23 for shifting speed ratio of the transmission 2 that shifts speed ratio of rotation output from the engine 1 serving as power source (FIG. 2). The mode setting unit 54 defines a shift map matched to the travel pattern recognized by the travel pattern recognition unit 52, i.e., matched to follow-evaluation value β (FIG. 11). The actuator control unit 55 controls the shift actuator 23 in accordance with the shift map defined by the mode setting unit 54. As a result, the transmission 2 can be optimally upshifted and downshifted in accordance with travel pattern of the forward vehicle.

Various modifications of the aforesaid embodiment are possible. Examples are explained below. In the aforesaid embodiment, the travel pattern recognition unit 52 recognizes travel pattern of the forward vehicle based on follow ratio αA, distance deviation mean value αB or acceleration mean value αC, but a travel pattern recognition unit is not limited to the aforesaid configuration and travel pattern of the forward vehicle can instead be recognized based on other parameters having correlation with travel pattern of the forward vehicle. Optionally, travel pattern can be recognized without using the inter-vehicle distance calculation unit 51 and/or road data acquisition portion (road data reading unit 53). In the aforesaid embodiment, inter-vehicle distance L is detected based on signals from the RADAR 312 and/or the camera 313, but an inter-vehicle distance detecting portion is not limited to this configuration.

Although in the aforesaid embodiment, the mode setting unit 54 sets travel mode based on relationship between follow-evaluation value β (numerically quantified travel pattern of the forward vehicle) and response evaluation value γ (numerically quantified travel mode) (FIG. 11), a mode setting unit is not limited to this configuration. For example, it is possible in autonomous travel mode not to set travel mode between economy mode (first travel mode) and normal mode (second travel mode) and between normal mode and sport mode (third travel mode) but to set travel mode in a predefined one of multiple modes (economy mode, normal mode, sport mode).

In the aforesaid embodiment, switching between manual drive mode and self-drive mode is instructed through the self/manual drive select switch 331, but a first instructing portion is not limited to this configuration. When a dedicated self-driving vehicle is adopted as the subject vehicle, the first instructing portion can be omitted. In the aforesaid embodiment, economy mode, normal mode, sport mode and the like are manually selected using the travel mode select switch 332 as a second instructing portion, but travel modes selected by the second instructing portion are not limited to these. For example, an arrangement enabling selection between two travel modes or selection from among four or more travel modes can be adopted. In the case of a configuration that sets only a single travel mode, the second instructing portion can be omitted.

In the aforesaid embodiment, the display control unit 47 is adapted to output control signals to the display 333 in order to inform the user that a difference between acceleration performance prescribed by travel mode selected by the travel mode select switch 332 and acceleration performance in accordance with travel pattern recognized by the travel pattern recognition unit 52 is equal to or greater than a predetermined value. However, an informing portion is not limited to this configuration and can instead be configured to convey such information by voice, for example.

The present invention can also be used as a vehicle travel control method configured to control an actuator for driving a vehicle with a self-driving capability so that the vehicle follows a forward vehicle in front of the vehicle.

The above embodiment can be combined as desired with one or more of the above modifications. The modifications can also be combined with one another.

According to the present invention, it is possible to follow a forward vehicle in optimum manner in accordance with travel pattern of the forward vehicle.

Above, while the present invention has been described with reference to the preferred embodiments thereof, it will be understood, by those skilled in the art, that various changes and modifications may be made thereto without departing from the scope of the appended claims.

What is claimed is:

1. A vehicle travel control apparatus configured to control an actuator for driving a vehicle with a self-driving capability so that the vehicle follows a forward vehicle in front of the vehicle, the vehicle travel control apparatus comprising:

an electric control unit having a microprocessor and a memory, wherein
the microprocessor is configured to perform:
calculating a follow-evaluation value expressing a degree of difference between a travel pattern of the vehicle and a travel pattern of the forward vehicle;
setting a travel mode as one of a plurality of predetermined travel modes with an acceleration performance in accordance with the follow-evaluation value calculated in the calculating, wherein the plurality of predetermined travel modes includes a first, second, and third travel mode each corresponding to a respective range of follow-evaluation value where power is prioritized over fuel economy for mode with higher follow-evaluation value; and
controlling the actuator so that the vehicle follows the forward vehicle in the travel mode set in the setting, wherein
the microprocessor is configured to further perform acquiring road data around the vehicle, wherein
the calculating including correcting, when data on a curve is included in the road data acquired in the acquiring, the follow-evaluation value by multiplying the follow-evaluation value by a predetermined coefficient.

2. The apparatus according to claim 1, further comprising
a first instructing portion configured to instruct a manual drive mode or a self-drive mode; and
a second instructing portion configured to manually instruct one travel mode among an autonomous travel mode and the plurality of predetermined travel modes, wherein
the microprocessor is configured to perform the setting including setting the travel mode instructed by the second instructing portion,
the autonomous travel mode is a travel mode with the acceleration performance in accordance with the follow-evaluation value calculated in the calculating, and
the plurality of predetermined travel modes includes the first travel mode in which a fuel economy performance is prioritized over a power performance, the second travel mode in which the fuel economy performance and the power performance are balanced, and the third travel mode in which the power performance is prioritized over the fuel economy performance.

3. The apparatus according to claim 2, wherein
the microprocessor is configured to perform
the setting including setting the travel mode instructed by the second instructing portion when the manual drive mode is instructed by the first instructing portion, and thereafter when switching from the manual drive mode to the self-drive mode is instructed by the first instructing portion, gradually changing from the travel mode instructed in the manual drive mode to the autonomous travel mode.

4. The apparatus according to claim 3, wherein
the microprocessor is configured to perform
when the self-drive mode is instructed by the first instructing portion and the manual travel mode is instructed by the second instructing portion, the setting including setting the manual travel mode.

5. The apparatus according to claim 4, further comprising
an informing portion configured to inform a driver that a difference between the acceleration performance in accordance with the follow-evaluation value calculated in the calculating and an acceleration performance prescribed by the manual travel mode instructed by the second instructing portion is equal to or greater than a predetermined value, under a condition that the self-drive mode is instructed by the first instructing portion and the manual travel mode is instructed by the second instructing portion.

6. The apparatus according to claim 1, wherein
the vehicle includes a power source and a transmission changing a speed of a rotation output from the power source,
the actuator includes a shift actuator changing a speed ratio of the transmission, and
the microprocessor is configured to perform
the setting including setting a shift map in accordance with the follow-evaluation value calculated in the calculating, and
the controlling including controlling the shift actuator in accordance with the shift map set in the setting.

7. The apparatus according to claim 1, further comprising
an inter-vehicle distance detecting portion configured to detect an inter-vehicle distance from the vehicle to the forward vehicle, wherein
the microprocessor is configured to further perform
calculating a distance deviation representing a degree of divergence of the inter-vehicle distance detected by the inter-vehicle detecting portion from a predetermined target inter-vehicle distance,
calculating a time period when an absolute value of the distance deviation stays within a predetermined value and calculating a follow ratio by dividing the time period by a total running time of the vehicle, and
the calculating the follow-evaluation value including calculating the follow-evaluation value so that the follow-evaluation value is higher as the follow ratio is greater.

8. The apparatus according to claim 7, wherein
the microprocessor is configured to perform
the calculating the follow-evaluation value including correcting, when the data on the curve is included in the road data acquired in the acquiring, the follow-evaluation value by multiplying the follow-evaluation value by the predetermined coefficient greater than 0 and less than 1.

9. The apparatus according to claim 1, wherein
the microprocessor is configured to perform
calculating a distance deviation representing a degree of divergence of the inter-vehicle distance detected by the inter-vehicle detecting portion from a predetermined target inter-vehicle distance, and
the calculating the follow-evaluation value including calculating, when a frequency of the distance deviation is able to be expressed in normal distribution, the follow-evaluation value so that the follow-evaluation value is higher as a mean value of the distance deviation is greater.

10. The apparatus according to claim 9, wherein
the microprocessor is configured to perform
the calculating the follow-evaluation value including calculating, when the frequency of the distance deviation is able to be expressed in normal distribution, the follow-evaluation value based on the mean value of the distance deviation and a magnitude of a dispersion of the normal distribution.

11. The apparatus according to claim 1, wherein
the microprocessor is configured to perform
calculating a mean value of an acceleration magnitude of the forward vehicle, and
the calculating the follow-evaluation value including calculating the follow-evaluation value so that the follow-evaluation value is higher as the mean value is greater.

12. A vehicle travel control method controlling an actuator for driving a vehicle with a self-driving capability so that the vehicle follows a forward vehicle in front of the vehicle, the vehicle travel control method comprising:
calculating a follow-evaluation value expressing a degree of difference between a travel pattern of the vehicle and a travel pattern of the forward vehicle;
setting a travel mode as one of a plurality of predetermined travel modes with an acceleration performance in accordance with the follow-evaluation value, wherein the plurality of predetermined travel modes includes a first, second, and third travel mode each corresponding to a respective range of follow-evaluation value where power is prioritized over fuel economy for mode with higher follow-evaluation value;
controlling the actuator so that the vehicle follows the forward vehicle in the travel mode, and
acquiring road data around the vehicle, wherein,
the calculating including correcting, when data on a curve is included in the road data acquired in the acquiring, the follow-evaluation value by multiplying the follow-evaluation value by a predetermined coefficient.

\* \* \* \* \*